United States Patent [19]

Maroschak

[11] 3,843,758

[45] Oct. 22, 1974

[54] METHOD FOR MAKING AND SLITTING PLASTIC CORRUGATED TUBES

[75] Inventor: Ernest Maroschak, Roseboro, N.C.

[73] Assignee: Plastic Tubing, Inc., Roseboro, N.C.

[22] Filed: July 13, 1972

[21] Appl. No.: 271,226

[52] U.S. Cl.................. 264/40, 425/296, 425/303, 425/326 B, 425/336, 425/DIG. 203 C
[51] Int. Cl.... B29c 17/07, B29c 17/10, B29c 17/15
[58] Field of Search............ 264/40, 89, 90, 92, 93, 264/94, 95, 98, 99, 148, 150, 151, 149, 154, 156, 209, 238, DIG. 052; 425/142, 296, 302, 303, 326, 342, 343, 396, DIG. 203, DIG. 203 C, 206, 211

[56] References Cited
UNITED STATES PATENTS

| | | | |
|---|---|---|---|
| 2,469,342 | 5/1949 | Richardson | 264/148 |
| 2,649,618 | 8/1953 | Rhodes et al. | 264/40 |
| 2,777,160 | 1/1957 | Rulison et al. | 264/40 |
| 2,930,102 | 3/1960 | Hitchin et al. | 264/40 UX |
| 3,183,571 | 5/1965 | Schmunk et al. | 264/156 X |
| 3,329,998 | 7/1967 | Stohr | 264/209 X |
| 3,395,200 | 7/1968 | Mader, Jr. et al. | 264/40 |
| 3,538,209 | 11/1970 | Hegler | 264/90 |
| 3,732,046 | 5/1973 | Martin | 264/40 X |

Primary Examiner—Jan H. Silbaugh
Attorney, Agent, or Firm—Parrott, Bell, Seltzer, Park & Gibson

[57] ABSTRACT

A method for making plastic corrugated tubes particularly useful for irrigation pipes, and wherein a tube of hot plastic material is extruded into a blow molding zone which molds annular corrugations of alternating ribs and valleys on the tube during forward movement thereof through the molding zone. The thus molded corrugated tube is delivered from the molding zone and fed through a slitting station wherein series of circularly spaced slits are cut in certain valleys of the tube by circularly arranged slitting saws or cutting blades. The slit tube is directed from the slitting station through a cutting station where it is cut into predetermined lengths ready for delivery to a customer.

15 Claims, 16 Drawing Figures

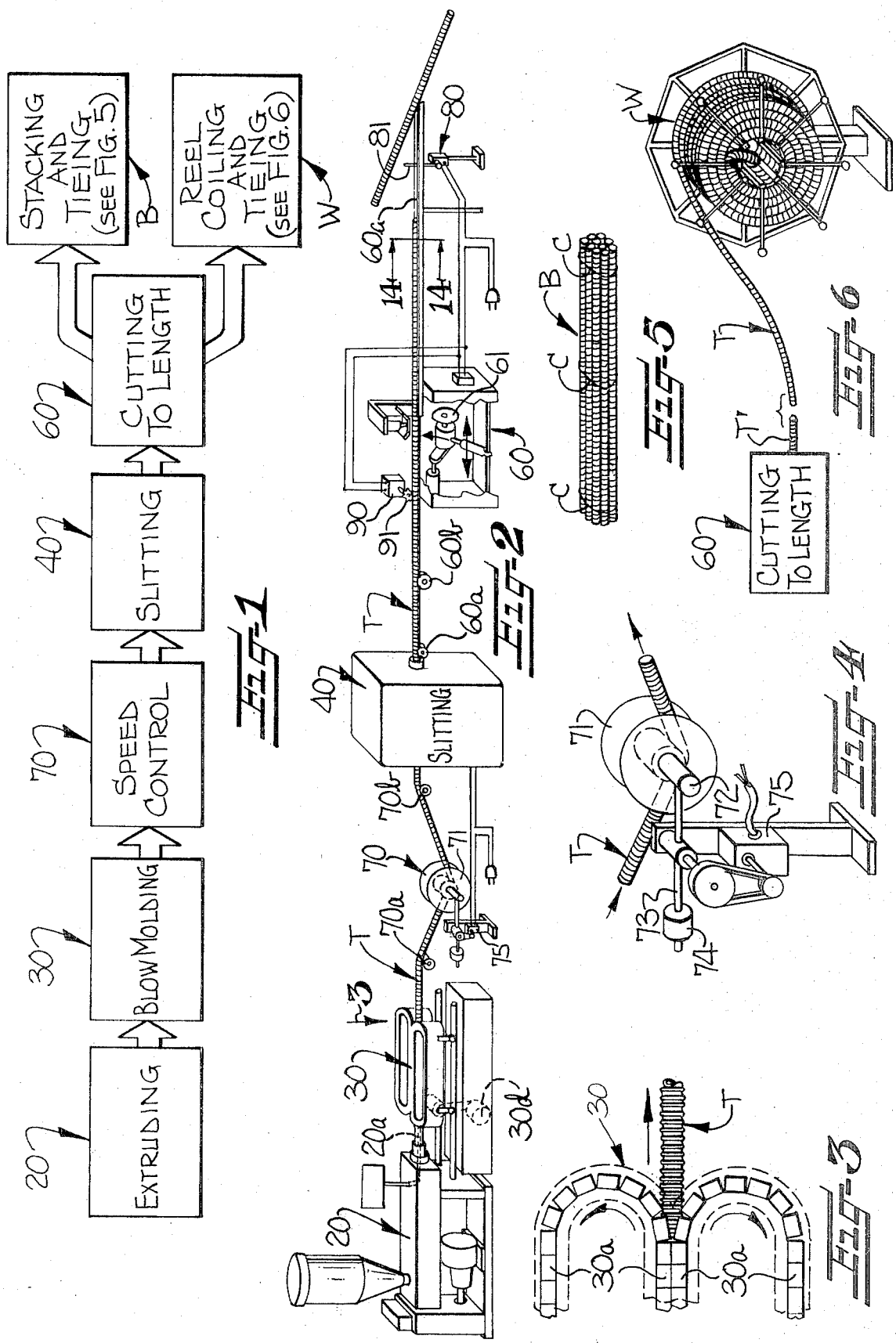

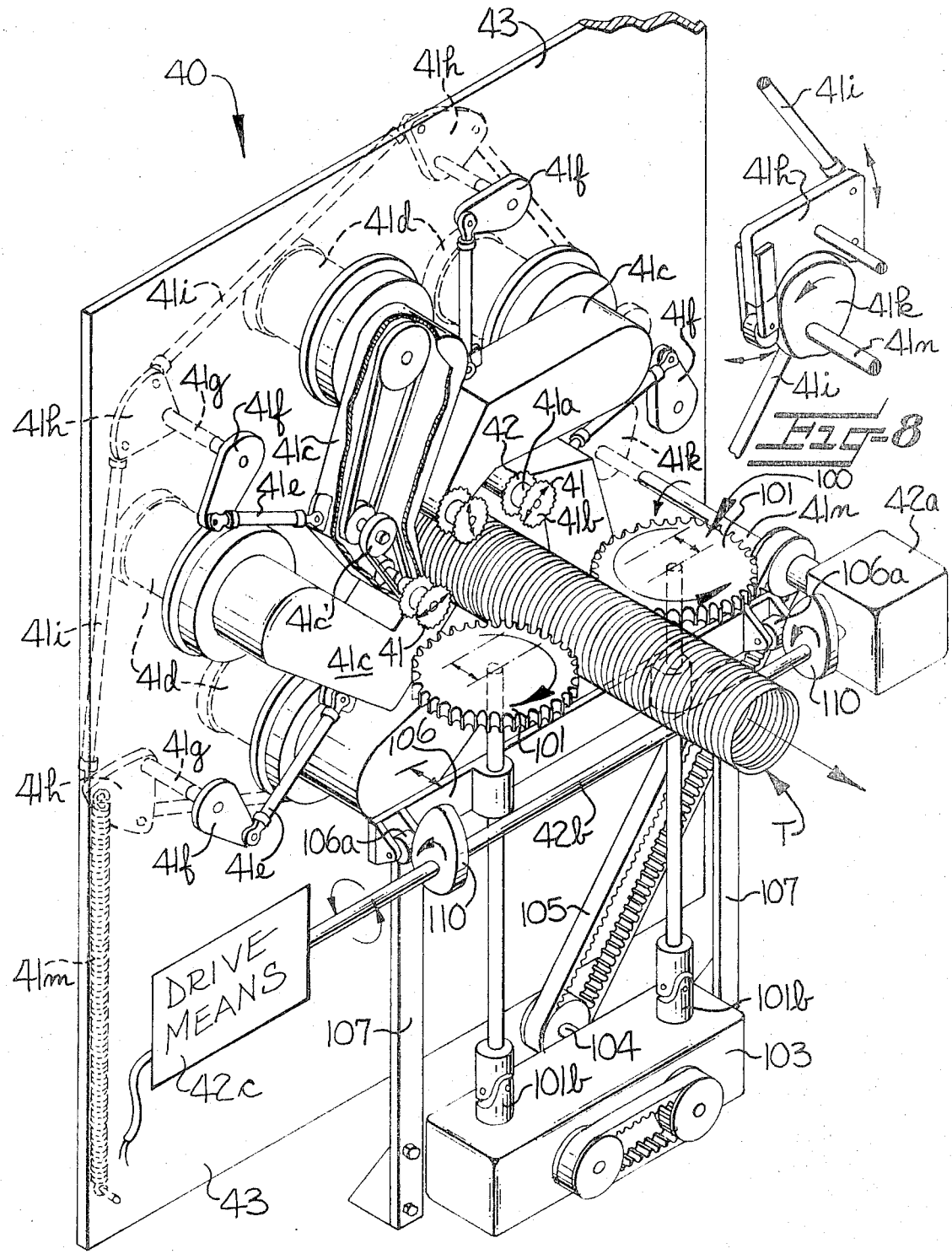

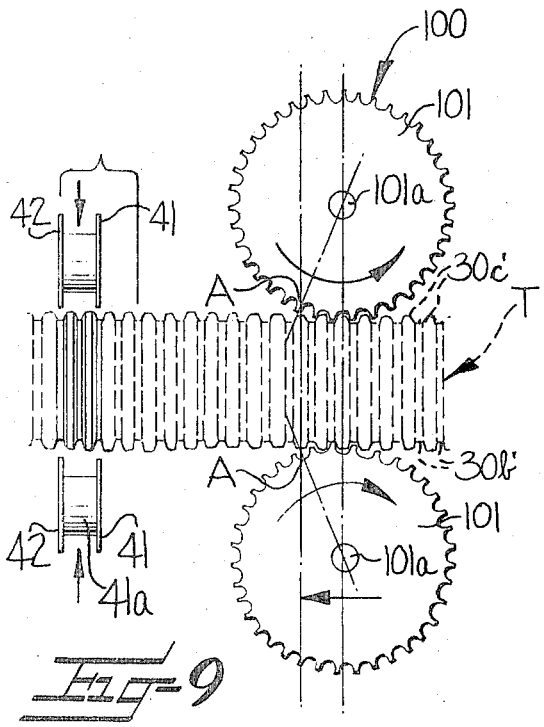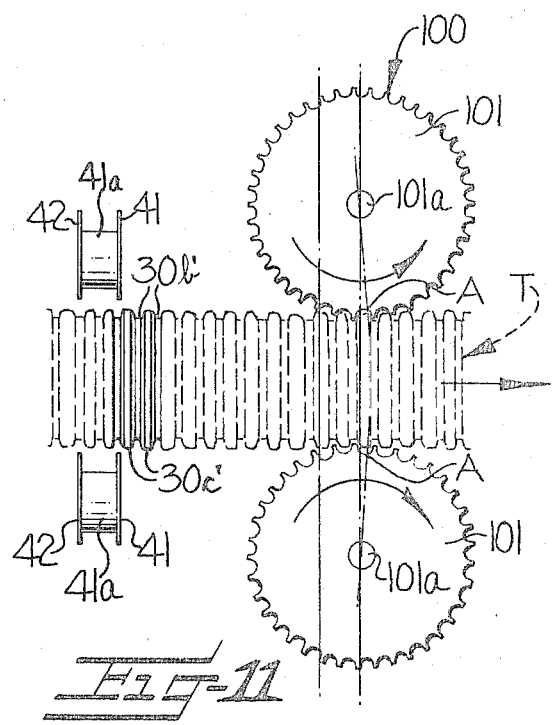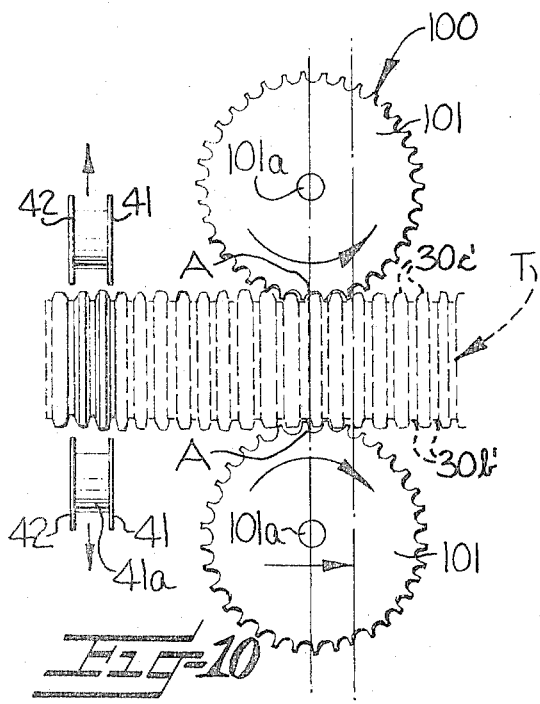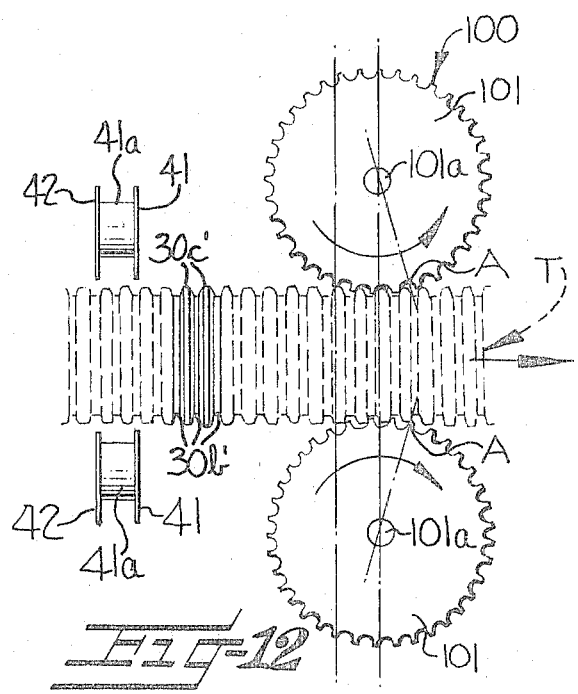

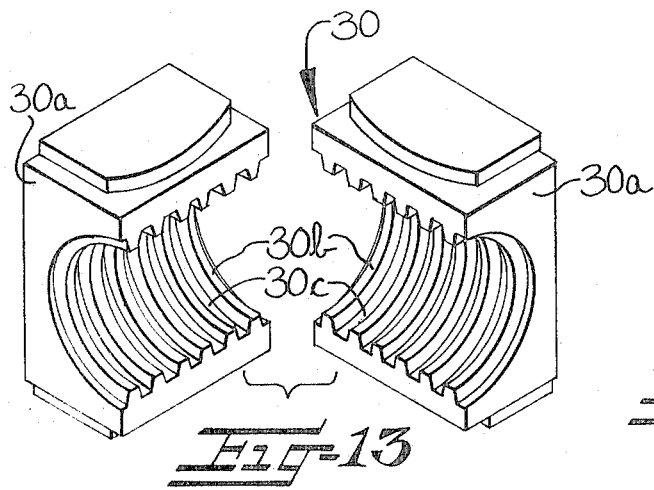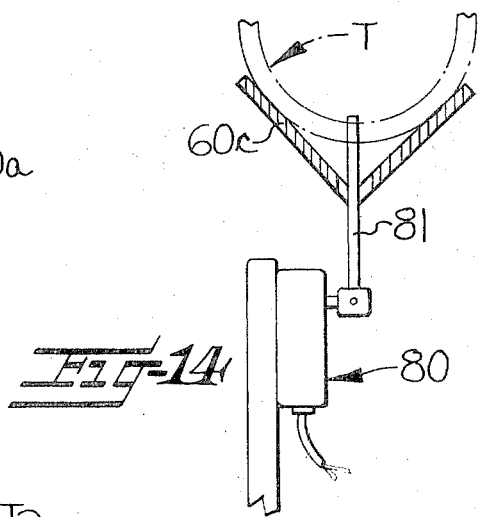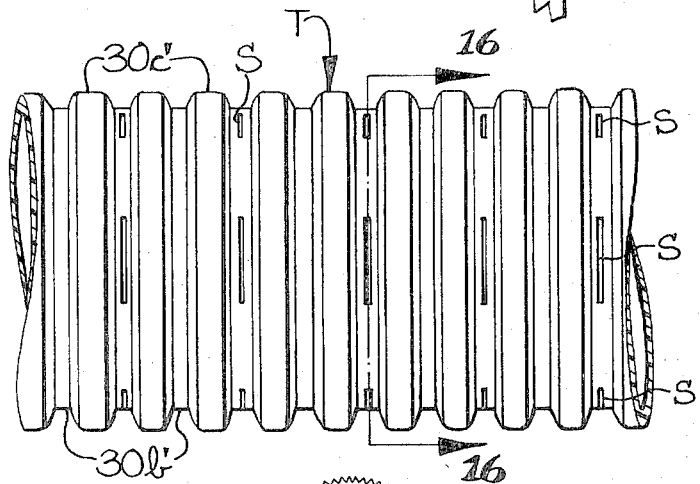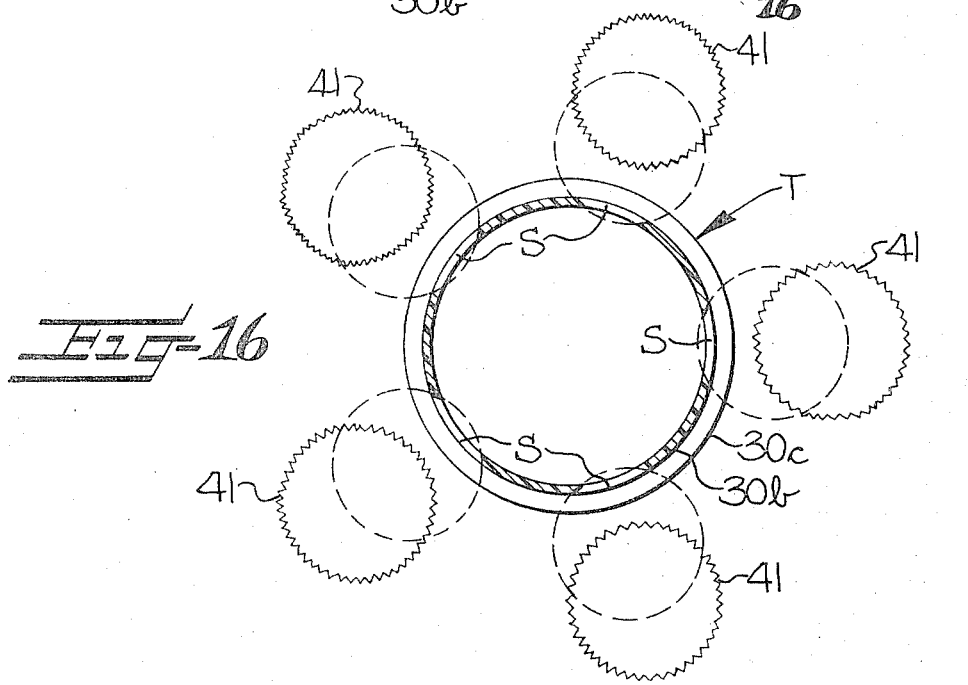

METHOD FOR MAKING AND SLITTING PLASTIC CORRUGATED TUBES

This invention relates to an improved method for making and slitting plastic corrugated tubes which are particularly useful for underground irrigation systems, and it is an important object of this invention to provide a method facilitating a highly efficient and high rate of production of a plastic corrugated tube of the type described, in which a tube of hot plastic material is extruded into and directed through a blow molding zone to form annular corrugations thereon at the same time that radial, arcuately extending or transverse slits are being formed in certain successive valleys of the tube passing through a slitting station spaced downstream from the blow molding zone, and also at the same time that the corrugated tube is being directed from the slitting station through a cutting station and cut into predetermined lengths, all in a continuous operation.

It is a more specific object of this invention to provide a method for continuously making plastic corrugated tubing and forming slits therein wherein an extruder is utilized for extruding a tube of hot plastic material into a blow molding zone including a series of cooperating pairs of forwardly moving die blocks for receiving the extruded tube therebetween. The pairs of die blocks define an elongate annular corrugated mold cavity for molding annular corrugations of alternating ribs and valleys on the tube during forward movement thereof through the blow molding zone at a predetermined speed, and a slitting station and a cutting station are successively arranged downstream of the molding zone. Means are provided for feeding the corrugated tube emerging from the molding zone successively through the slitting and cutting stations and includes a plurality of forwardly moving teeth, preferably in the form of a feed gear or gears, for meshingly engaging the corrugations of the tube so that the successive teeth enter successive valleys and push forwardly against the ribs of the corrugated tube, and means are provided for driving the teeth forwardly in timed relation to the forward movement of the die blocks. The slitting station includes means for repeatedly forming a plurality of transverse radial slits in certain of the valleys of the tube in timed relation to movement of the tube through the slitting station, and the cutting station includes means for severing the slit corrugated tube into predetermined lengths.

Some of the objects of the invention having been stated, other objects will appear as the description proceeds when taken in connection with the accompanying drawings, in which:

FIG. 1 is a block diagram of the method of making and processing a plastic tube in accordance with this invention;

FIG. 2 is a schematic perspective view of an arrangement of apparatus for carrying out the method of this invention;

FIG. 3 is a fragmentary top plan view looking in the direction of arrow 3 of FIG. 2 and illustrating the corrugated plastic tube being delivered from the blow molding machine;

FIG. 4 is an enlarged fragmentary perspective view of the speed control or tube tension sensing means shown in the central portion of FIG. 2;

FIG. 5 is a perspective view of a tied bundle of cut lengths of the corrugated tube formed in accordance with this invention;

FIG. 6 is a schematic view of the coiling of the corrugated tube into a wound package;

FIG. 7 is a schematic, fragmentary, perspective view of a slitting station for forming radial slits in certain valleys of the corrugated tube and also illustrating an improved tube feeding means in association therewith;

FIG. 8 is a fragmentary perspective view of a rotary cam for imparting inward and outward movements to the rotary cutting blades or slitting saws of the cutting station;

FIGS. 9–12 are fragmentary schematic plan views illustrating successive stages in the operation of the rotary cutting blades and feeding means of the slitting station;

FIG. 13 is a perspective view of one cooperating pair of the corrugated die blocks shown in FIG. 3, with the die blocks shown in exploded relationship in FIG. 13;

FIG. 14 is a fragmentary vertical sectional view taken substantially along line 14—14 in FIG. 2 and illustrating the control switch means for actuating the tube cutting station in response to engagement of the control switch by the leading end of the corrugated tube;

FIG. 15 is an enlarged fragmentary view of a portion of the slit corrugated tube particularly illustrating a preferred arrangement of the slits in alternate valleys of the corrugated tube; and FIG. 16 is an enlarged schematic vertical sectional view through the corrugated tube and particularly showing the relationship between the tube and the rotary cutting blades of the slitting station shown in FIG. 7.

Referring more specifically to the drawings, especially FIG. 2, an extruding machine 20 is arranged to continuously extrude and feed a tube of hot plastic material to a blow molding machine broadly designated at 30. As is well known, a blow molding machine for continuously forming a corrugated tube has an enlongate blow molding zone in the medial portion thereof which is open at its rear and forward ends for receiving and molding the tube of hot plastic material from the extruding machine, with the molding zone being defined by a series of cooperating pairs of forwardly moving die blocks 30a (FIG. 13). Each die block 30a is of semitubular form and has a concave semicircular corrugated mold surface therein so that each die block of each pair cooperates with the other die block of the same pair to form an annular corrugated mold cavity of alternating ribs and valleys 30b, 30c in each pair of die blocks 30a.

As the tube of hot plastic material is extruded into the rear portion of the blow molding zone, conventional means 20a introduces compressed air or other fluid under pressure into the tube to expand the same against the mold cavities and thereby mold annular corrugations of alternating ribs and valleys along the length of the tube. Also, as is well known, the moving die blocks 30a are driven in two endless paths by suitable drive means shown schematically at 30d in FIG. 2, which drive means 30d continuously moves the cooperating pairs of die blocks 30a forwardly along the blow molding zone to deliver the molded corrugated plastic tube T forwardly at a predetermined speed.

An enlarged view of a portion of the corrugated tube T is shown in FIG. 15 wherein it will be observed that the valleys and ribs of the tube T are respectively designated at 30b', 30c'. The tube may be of lightweight construction preferably with a wall thickness of no greater than about 1/16 inch and may be of a nominal diameter of about 4, 5, 6 or 7 inches. A tube having a four inch nominal diameter, for example, may have an internal diameter of about 3.916 inches measured at the interior of the valleys 30b' (FIG. 15), and an external diameter of 4.566 inches. Also, by way of example, the tube may include about 17 ribs 30c' per linear foot, with each rib 30c' having a width of approximately ½ inch, the height of each rib when measured from the annular valleys 30b' being about .270 inch, and the width of the annular valleys 30b' taken between the junctures of the side walls of the adjacent ribs 30c' being about .187 inch.

As indicated in FIGS. 1 and 2, the molded corrugated plastic tube T being delivered from blow molding machine 30 is directed through a slitting machine or station, broadly designated at 40, and then is directed to a cutting machine or cutting station broadly designated at 60. Also, a speed control or tube tension sensing device 70 is provided between the molding machine 30 and the slitting station 40 for controlling the rate of feed of the tube T through slitting station 40.

As will be later described in detail, slitting station 40 is provided with means operating in timed relation to forward movement of the corrugated tube T for forming a circular series of slits S through each of certain of the valleys 30b' (FIG. 15), and preferably in alternately spaced valleys 30b' of the tube T. The thus slit tube T then passes over suitable supporting elements or rollers 60a, 60b to the tube cutting station 60 which is normally inactive, but is activated at predetermined times either by a sensing limit switch 80 (FIGS. 2 and 14) or a surface engaging measuring switch or counter 90 (FIG. 2), at the will of the operator.

As shown in FIGS. 2 and 14, sensing limit switch 80 is provided with a sensing arm 81 which normally protrudes upwardly through a pipe guide trough 60c and into the path of travel of the leading end of the tube T being moved along the trough 60c. Upon the leading end of the tube T engaging the switch sensing arm 81, switch 80 will be closed to actuate the motorized saw 61 of cutting station 60. As is conventional, the motorized saw 61 is mounted for forward movement with the tube T during the cutting operation, and upon the cutting being completed, the saw 61 is moved upstream to its original location, ready for the next cutting operation. Thus, if it is desired to form uniform cut lengths of the tube, such as 10 foot lengths, the sensing limit switch 80 is used for controlling the operation of cutting station 60. For ease in handling such cut lengths, it is desirable to nestingly stack the same and form a bundle B with a plurality of tied strings or cords C therearound, as illustrated in FIG. 5.

On the other hand, if the customer desires a relatively long length of the tube, such as 250 feet, it is desirable for ease in handling the tube to coil the same into a wound package W, as illustrated in FIG. 6. In this instance, the sensing limit switch 80 may be immobilized, as by moving the sensing arm 81 thereof out of the path of the leading end of the tube T, and instead, the length measuring switch is electrically and operatively connected to the motorized saw 61. Conveniently, measuring switch 90 may include a suitable measuring or sensing roller 91 which is placed in engagement with the moving surface of the tube T so as to sense the linear length of the tube moving past the same and, upon a predetermined length being sensed, for example, 250 feet, the motorized saw 61 will be actuated to cut the tube T in two. In this event, it is to be understood that the terminal end T' of the tube (FIG. 6) to be coiled will then be free to be wound onto the reel to complete the wound package W.

Referring now to the slitting station 40, in its preferred embodiment, the slitting station is so constructed as to cut a circular series of five transverse radial slits around the tube through each of certain valleys 30b' of the tube T; preferably through alternately spaced valleys, with the cutting of the circular series of slits in any given valley being effected simultaneously. Accordingly, as shown in FIGS. 7 and 16, slitting station 40 comprises a circularly arranged series of five substantially equally angularly spaced pairs of slitting saws or rotary cutting blades, with the rotary cutting blades of each pair being axially aligned and indicated at 41 and 42. The axis of each pair of cutting blades 41, 42 extends substantially parallel with the path of travel of tube T through slitting station 40.

The center-to-center distance between the two blades of each pair 41, 42 is substantially the same as the distance between the centers of alternate valleys 30b' of the corrugated plastic tube T so that, each time the five pairs of blades 41, 42 are moved into cutting relation with tube T as shown in broken lines in FIG. 16, each pair of blades 41, 42 will cut corresponding slits S in two alternately spaced valleys 30b'. In other words, each time the five pairs of cutting blades 41, 42 are moved into cutting relation with tube T, the two sets of blades simultaneously cut a circular series of elongate arcuate radial slits S around the tube through each of two alternately spaced valleys 30b' thereof. Each of the rotary cutting blades 41, 42 preferably is no more than about 1/16 inch thick and may be about 3½ inches in diameter with the active or inward strokes of the rotary cutting blades 41, 42 being such relative to the tube encircled thereby that each of the slits S is about 1/16 inch wide and extends arcuately through the peripheral wall of the respective valley 30b' for a distance of about ¾ inch to 2 inches, with the desired length of each slit S being determined to some extent by the diameter of the plastic corrugated tube T. It is apparent that the valleys 30b' are substantially wider than the slits S, as is desirable.

Since there are five rotary cutting blades in each set, they are preferably arranged in equally spaced relation or about 72° between the centers thereof in a circular manner around the path of travel of the tube T through slitting station 40. Each pair of cutting blades 41, 42 is held in the proper spaced relationship by a suitable sleeve 41a, and they are fixed on a common shaft 41b (FIG. 7) journaled in the inner or free end portion of a swingable or pivoted housing 41c. Each housing 41c contains suitable transmission means, embodied in suitable belt and pulley connections 41c', which connect the corresponding shaft 41b to a respective drive motor 41d. The five motors 41d are mounted in a stationary wall 43 of the housing of slitting station 40 so that the motors 41d occupy fixed positions spaced around the axis of tube T as it moves through slitting station 40.

METHOD FOR MAKING AND SLITTING PLASTIC CORRUGATED TUBES

This invention relates to an improved method for making and slitting plastic corrugated tubes which are particularly useful for underground irrigation systems, and it is an important object of this invention to provide a method facilitating a highly efficient and high rate of production of a plastic corrugated tube of the type described, in which a tube of hot plastic material is extruded into and directed through a blow molding zone to form annular corrugations thereon at the same time that radial, arcuately extending or transverse slits are being formed in certain successive valleys of the tube passing through a slitting station spaced downstream from the blow molding zone, and also at the same time that the corrugated tube is being directed from the slitting station through a cutting station and cut into predetermined lengths, all in a continuous operation.

It is a more specific object of this invention to provide a method for continuously making plastic corrugated tubing and forming slits therein wherein an extruder is utilized for extruding a tube of hot plastic material into a blow molding zone including a series of cooperating pairs of forwardly moving die blocks for receiving the extruded tube therebetween. The pairs of die blocks define an elongate annular corrugated mold cavity for molding annular corrugations of alternating ribs and valleys on the tube during forward movement thereof through the blow molding zone at a predetermined speed, and a slitting station and a cutting station are successively arranged downstream of the molding zone. Means are provided for feeding the corrugated tube emerging from the molding zone successively through the slitting and cutting stations and includes a plurality of forwardly moving teeth, preferably in the form of a feed gear or gears, for meshingly engaging the corrugations of the tube so that the successive teeth enter successive valleys and push forwardly against the ribs of the corrugated tube, and means are provided for driving the teeth forwardly in timed relation to the forward movement of the die blocks. The slitting station includes means for repeatedly forming a plurality of transverse radial slits in certain of the valleys of the tube in timed relation to movement of the tube through the slitting station, and the cutting station includes means for severing the slit corrugated tube into predetermined lengths.

Some of the objects of the invention having been stated, other objects will appear as the description proceeds when taken in connection with the accompanying drawings, in which:

FIG. 1 is a block diagram of the method of making and processing a plastic tube in accordance with this invention;

FIG. 2 is a schematic perspective view of an arrangement of apparatus for carrying out the method of this invention;

FIG. 3 is a fragmentary top plan view looking in the direction of arrow 3 of FIG. 2 and illustrating the corrugated plastic tube being delivered from the blow molding machine;

FIG. 4 is an enlarged fragmentary perspective view of the speed control or tube tension sensing means shown in the central portion of FIG. 2;

FIG. 5 is a perspective view of a tied bundle of cut lengths of the corrugated tube formed in accordance with this invention;

FIG. 6 is a schematic view of the coiling of the corrugated tube into a wound package;

FIG. 7 is a schematic, fragmentary, perspective view of a slitting station for forming radial slits in certain valleys of the corrugated tube and also illustrating an improved tube feeding means in association therewith;

FIG. 8 is a fragmentary perspective view of a rotary cam for imparting inward and outward movements to the rotary cutting blades or slitting saws of the cutting station;

FIGS. 9–12 are fragmentary schematic plan views illustrating successive stages in the operation of the rotary cutting blades and feeding means of the slitting station;

FIG. 13 is a perspective view of one cooperating pair of the corrugated die blocks shown in FIG. 3, with the die blocks shown in exploded relationship in FIG. 13;

FIG. 14 is a fragmentary vertical sectional view taken substantially along line 14—14 in FIG. 2 and illustrating the control switch means for actuating the tube cutting station in response to engagement of the control switch by the leading end of the corrugated tube;

FIG. 15 is an enlarged fragmentary view of a portion of the slit corrugated tube particularly illustrating a preferred arrangement of the slits in alternate valleys of the corrugated tube; and FIG. 16 is an enlarged schematic vertical sectional view through the corrugated tube and particularly showing the relationship between the tube and the rotary cutting blades of the slitting station shown in FIG. 7.

Referring more specifically to the drawings, especially FIG. 2, an extruding machine 20 is arranged to continuously extrude and feed a tube of hot plastic material to a blow molding machine broadly designated at 30. As is well known, a blow molding machine for continuously forming a corrugated tube has an enlongate blow molding zone in the medial portion thereof which is open at its rear and forward ends for receiving and molding the tube of hot plastic material from the extruding machine, with the molding zone being defined by a series of cooperating pairs of forwardly moving die blocks 30a (FIG. 13). Each die block 30a is of semitubular form and has a concave semicircular corrugated mold surface therein so that each die block of each pair cooperates with the other die block of the same pair to form an annular corrugated mold cavity of alternating ribs and valleys 30b, 30c in each pair of die blocks 30a.

As the tube of hot plastic material is extruded into the rear portion of the blow molding zone, conventional means 20a introduces compressed air or other fluid under pressure into the tube to expand the same against the mold cavities and thereby mold annular corrugations of alternating ribs and valleys along the length of the tube. Also, as is well known, the moving die blocks 30a are driven in two endless paths by suitable drive means shown schematically at 30d in FIG. 2, which drive means 30d continuously moves the cooperating pairs of die blocks 30a forwardly along the blow molding zone to deliver the molded corrugated plastic tube T forwardly at a predetermined speed.

An enlarged view of a portion of the corrugated tube T is shown in FIG. 15 wherein it will be observed that the valleys and ribs of the tube T are respectively designated at 30b', 30c'. The tube may be of lightweight construction preferably with a wall thickness of no greater than about 1/16 inch and may be of a nominal diameter of about 4, 5, 6 or 7 inches. A tube having a four inch nominal diameter, for example, may have an internal diameter of about 3.916 inches measured at the interior of the valleys 30b' (FIG. 15), and an external diameter of 4.566 inches. Also, by way of example, the tube may include about 17 ribs 30c' per linear foot, with each rib 30c' having a width of approximately ½ inch, the height of each rib when measured from the annular valleys 30b' being about .270 inch, and the width of the annular valleys 30b' taken between the junctures of the side walls of the adjacent ribs 30c' being about .187 inch.

As indicated in FIGS. 1 and 2, the molded corrugated plastic tube T being delivered from blow molding machine 30 is directed through a slitting machine or station, broadly designated at 40, and then is directed to a cutting machine or cutting station broadly designated at 60. Also, a speed control or tube tension sensing device 70 is provided between the molding machine 30 and the slitting station 40 for controlling the rate of feed of the tube T through slitting station 40.

As will be later described in detail, slitting station 40 is provided with means operating in timed relation to forward movement of the corrugated tube T for forming a circular series of slits S through each of certain of the valleys 30b' (FIG. 15), and preferably in alternately spaced valleys 30b' of the tube T. The thus slit tube T then passes over suitable supporting elements or rollers 60a, 60b to the tube cutting station 60 which is normally inactive, but is activated at predetermined times either by a sensing limit switch 80 (FIGS. 2 and 14) or a surface engaging measuring switch or counter 90 (FIG. 2), at the will of the operator.

As shown in FIGS. 2 and 14, sensing limit switch 80 is provided with a sensing arm 81 which normally protrudes upwardly through a pipe guide trough 60c and into the path of travel of the leading end of the tube T being moved along the trough 60c. Upon the leading end of the tube T engaging the switch sensing arm 81, switch 80 will be closed to actuate the motorized saw 61 of cutting station 60. As is conventional, the motorized saw 61 is mounted for forward movement with the tube T during the cutting operation, and upon the cutting being completed, the saw 61 is moved upstream to its original location, ready for the next cutting operation. Thus, if it is desired to form uniform cut lengths of the tube, such as 10 foot lengths, the sensing limit switch 80 is used for controlling the operation of cutting station 60. For ease in handling such cut lengths, it is desirable to nestingly stack the same and form a bundle B with a plurality of tied strings or cords C therearound, as illustrated in FIG. 5.

On the other hand, if the customer desires a relatively long length of the tube, such as 250 feet, it is desirable for ease in handling the tube to coil the same into a wound package W, as illustrated in FIG. 6. In this instance, the sensing limit switch 80 may be immobilized, as by moving the sensing arm 81 thereof out of the path of the leading end of the tube T, and instead, the length measuring switch is electrically and operatively connected to the motorized saw 61. Conveniently, measuring switch 90 may include a suitable measuring or sensing roller 91 which is placed in engagement with the moving surface of the tube T so as to sense the linear length of the tube moving past the same and, upon a predetermined length being sensed, for example, 250 feet, the motorized saw 61 will be actuated to cut the tube T in two. In this event, it is to be understood that the terminal end T' of the tube (FIG. 6) to be coiled will then be free to be wound onto the reel to complete the wound package W.

Referring now to the slitting station 40, in its preferred embodiment, the slitting station is so constructed as to cut a circular series of five transverse radial slits around the tube through each of certain valleys 30b' of the tube T; preferably through alternately spaced valleys, with the cutting of the circular series of slits in any given valley being effected simultaneously. Accordingly, as shown in FIGS. 7 and 16, slitting station 40 comprises a circularly arranged series of five substantially equally angularly spaced pairs of slitting saws or rotary cutting blades, with the rotary cutting blades of each pair being axially aligned and indicated at 41 and 42. The axis of each pair of cutting blades 41, 42 extends substantially parallel with the path of travel of tube T through slitting station 40.

The center-to-center distance between the two blades of each pair 41, 42 is substantially the same as the distance between the centers of alternate valleys 30b' of the corrugated plastic tube T so that, each time the five pairs of blades 41, 42 are moved into cutting relation with tube T as shown in broken lines in FIG. 16, each pair of blades 41, 42 will cut corresponding slits S in two alternately spaced valleys 30b'. In other words, each time the five pairs of cutting blades 41, 42 are moved into cutting relation with tube T, the two sets of blades simultaneously cut a circular series of elongate arcuate radial slits S around the tube through each of two alternately spaced valleys 30b' thereof. Each of the rotary cutting blades 41, 42 preferably is no more than about 1/16 inch thick and may be about 3½ inches in diameter with the active or inward strokes of the rotary cutting blades 41, 42 being such relative to the tube encircled thereby that each of the slits S is about 1/16 inch wide and extends arcuately through the peripheral wall of the respective valley 30b' for a distance of about ¾ inch to 2 inches, with the desired length of each slit S being determined to some extent by the diameter of the plastic corrugated tube T. It is apparent that the valleys 30b' are substantially wider than the slits S, as is desirable.

Since there are five rotary cutting blades in each set, they are preferably arranged in equally spaced relation or about 72° between the centers thereof in a circular manner around the path of travel of the tube T through slitting station 40. Each pair of cutting blades 41, 42 is held in the proper spaced relationship by a suitable sleeve 41a, and they are fixed on a common shaft 41b (FIG. 7) journaled in the inner or free end portion of a swingable or pivoted housing 41c. Each housing 41c contains suitable transmission means, embodied in suitable belt and pulley connections 41c', which connect the corresponding shaft 41b to a respective drive motor 41d. The five motors 41d are mounted in a stationary wall 43 of the housing of slitting station 40 so that the motors 41d occupy fixed positions spaced around the axis of tube T as it moves through slitting station 40.

Each housing 41c may be pivotally mounted on the casing of the respective motor 41d, and means are provided for simultaneously moving the inner portions of housings 41c inwardly and outwardly at predetermined times according to the predetermined speed at which tube T is delivered from the molding zone of molding machine 30. To this end, it will be observed that a link 41e connects each housing 41c to a crank 41f fixed on one end of a respective rocker shaft 41g. Rocker shafts 41g are journaled in stationary wall 43 and have respective cranks 41h on their outer ends, remote from cranks 41f. All of the cranks 41h are interconnected by suitable links 41i, there being one of the links 41i extending between and pivotally connected to each adjacent pair of cranks 41h.

As shown in FIG. 8, one of the cranks 41h has a cam follower 41j mounted thereon which is normally urged into engagement with the periphery of a rotary cam 41k, as by means of a suitable spring 41m (FIG. 7). It follows that, when the low surface of cam 41k is in registration with follower 41j, spring 41m causes all the rotary cutting blades 41, 42 to move yieldably into cutting engagement with the portion of the tube T surrounded thereby and to the extent permitted by the cam 41k. Conversely, when the high surface of cam 41k moves into engagement with follower 41j it is apparent that the cutting blades 41, 42 are withdrawn from tube T and moved out of the path of forward movement of tube T. Cam 41k is fixed on a cutter operating cam shaft 41n suitably journaled in a substantially horizontal position within the housing of slitting station 40.

Cam shaft 41n extends into a suitable gear box 42a containing suitable gearing, such as beveled gears, for connecting cam shaft 41n to a driven main cam shaft 42b in substantially right-angular relation thereto. Main cam shaft 42b also is suitably journaled in the housing of slitting station 40 and extends laterally beneath the path of travel of tube T through slitting station 40 and is suitably connected to an electrically operable drive means 42c which is preferably in the form of an electric motor of the DC type.

Improved means are provided for positively feeding the corrugated tube T through the slitting station 40 in a stepwise manner in timed relation to the operation of cutting blades 41, 42 and at an overall rate of forward movement which is substantially the same as the substantially uniform rate of delivery of the tube T from the blow molding zone of the molding machine 30. Although the positive feeding means may be considered as a part of slitting station 40, it is broadly designated at 100 in FIGS. 7 and 9–12 and is controlled by the speed control 70 in a manner to be later described.

The positive tube feed 100 is shown in the latter figures in the form of a pair of laterally spaced feed gears 101 each of which serves as back-up means for the other, and which are diametrically opposed relative to tube T and meshingly engage the corrugations along opposite sides of tube T. The shape and spacing of the peripheral teeth of each feed gear 101 are such that, during forward rotation of each gear 101, the corrugated tube T delivered from the molding machine 30 is fed through the slitting station 40 by virtue of the teeth meshingly engaging the corrugations of the tube with successive teeth entering successive valleys and pushing forwardly against the respective ribs of the corrugated tube.

The feed gears 101 are fixed on the upper portions of respective substantially upright shafts 101a whose lower portions are connected, by universal joints 101b, to corresponding output portions of a suitable gear box 103. The input shaft 104 of gear 103 is driven by suitable belt and pulley connections 105 between input shaft 104 and cutter operating cam shaft 41n.

In order to impart intermittent or stepwise forward movement to that portion of the tube T adjacent cutting blades 41, 42 in slitting station 40 and so that such portion of the tube is at a standstill whenever the pairs of cutting blades 41, 42 are in cutting engagement with respective valleys 31b″ of tube T, means are provided for imparting a reciprocatory translational movement to each of the feed gears 101 in a direction parallel to the axis of tube T so as to stop forward movement of the corresponding portion of tube T at predetermined intervals of predetermined duration without interrupting rotation of the feed gears 101 or moving the same out of engagement with the corrugated tube T. The rate and extent of rearward translational movement of each feed gear 101 are correlated to the rate of forward rotation of feed gears 101 so that the tube T dwells or remains at a standstill throughout the rearward translational movement of the feed gears. Of course, when the forward translational movement is imparted to the feed gears 101, the tube is moved forwardly at a rate equal to the rate of rotation of the feed gears combined with the rate of forward translational movement of the feed gears so that the overall rate of forward movement of the tube through the slitting station is substantially the same as the substantially uniform rate of delivery of the tube from the blow molding machine 30.

Accordingly, the upper portions of shafts 101a are journaled in a common transverse follower bar 106 fixed on the upper end of a pair of forwardly biased spring steel bars 107 which serve to urge a pair of followers 106a on bar 106 into engagement with the peripheral surfaces of respective rotary cams 110 fixed on main cam shaft 42b. The direction and extent of reciprocal translational movement of gears 101 by cams 110 is represented by the associated arrows and dash-dot lines in FIGS. 7 and 9–12. As indicated, each time the high surface portions of cams 110 move into engagement with the respective followers 106a, the upper portions of upright shafts 101a are moved rearwardly as the proximal portions of the feed gears 101 continue to rotate forwardly. It is apparent that this imparts rearward translational movement to the feed gears 101 relative to the tube T without interrupting rotation thereof so that, for example, a point A on each feed gear 101 (FIG. 9) remains stationary as the respective shafts 101a, and the axes of the feed gears 101, move rearwardly into the lateral plane of the point A as shown in FIG. 10. During the time that the axes of the shafts 101a and feed gears 101 are being moved rearwardly, with the point A on the feed gears 101 being maintained in a stationary position as in FIGS. 9 and 10, it is apparent that the tube T then dwells or is at a standstill. During such dwell of the tube, the low surface of cam 41k (FIG. 8) moves into registration with follower 41j, thus permitting spring 41m to move all five pairs of slitting saws or cutting blades 41, 42 yieldably into cutting engagement with tube T to effect the slitting of the sam in the manner heretofore described.

The succeeding high point of cam 41k then moves into registration with follower 41j to return the pairs of cutting blades 41, 42 to the inactive position shown in FIGS. 7 and 9-12 so that, as forward translational movement is imparted to the two feed gears 101 from the position of FIG. 10 successively to that of FIGS. 11 and 12, the cutting blades 41, 42 are disposed outwardly of the path of travel or tube T. By comparing the solid-line and broken-line portions of tube T in FIGS. 9-12 it will be noted that the tube T is then rapidly advanced from the position of FIG. 9 through the position of FIG. 11 and to the position of FIG. 12; i.e., a distance equivalent to the center-to-center distance between four valleys 30b', as the low surfaces of cams 110 (FIG. 7) move into registration with the respective followers 106a. Thus, although the two sets of rotary cutting blades 41, 42 form two circular series of slits S in two alternately spaced valleys 30b' (FIG. 15) during each active stroke of the cutting blades 41, 42, it is apparent that the succeeding stepwise movements of tube T are such that slits still will be formed only in the alternate valleys 30b' of tube T.

Of course, since feed gears 101 rotate continuously in a forward direction, it is apparent that the rate of forward translational movement imparted to the feed gears 101 as the low surfaces of cams 110 move into registration with followers 106a is combined with the rate of rotation of the feed gears so as to impart an accelerated forward rate of movement to the tube which compensates for the lost motion thereof relative to the delivery speed of the molded tube being delivered by molding machine 30 so that the overall forward speed imparted to tube T by the feed gears 101 is substantially the same as the predetermined speed at which tube T is being delivered by molding machine 30.

In view of the fact that the tube T is normally in heated condition and not entirely cool at the instant that any given portion thereof is passing through slitting station 40, it is desirable to avoid stretching the tube T lengthwise as well as to avoid compressive shortening of the tube. To avoid these conditions, it is desirable to synchronize the speed of the feed gears 101 with the delivery rate of the corrugated tube coming from blow molding machine 30. This permits obtaining a final tube product which has a substantially uniform number of ribs and valleys per unit length thereof.

Referring now to the speed control tension device 70, as illustrated, it comprises a pulley 71 engaging tube T at a point between molding machine 30 and slitting station 40 (FIGS. 2 and 4). Preferably, in its course to and from pulley 71, the tube T passes over a pair of supporting rollers 70a, 70b as shown in FIG. 2. Pulley 71 is mounted for free rotation on a shaft 72 which, in turn, is carried by one end of a pivotally mounted counterbalance arm 73. Arm 73 has an adjustably mounted counterbalance weight 74 on the other end thereof. A potentiometer or rheostat 75, electrically connected to motor or drive means 42c (FIG. 7), is positioned below and operatively connected to counterbalance arm 73 as best shown in FIG. 4, so that potentiometer 75 is varied in accordance with the position of counterbalance arm 73; i.e., in the event that the tension in tube T increases above a predetermined amount and causes the pulley 71 to be lifted by the tube T, this reduces the speed of motor or drive means 42c, thus decreasing both the rotational and translational rate of movement of tube feed gears 101. Conversely, if tube T becomes unduly slack and the tension therein drops to a predetermined minimum such as to cause pulley 71 to move downwardly to a predetermined relatively lowered position, potentiometer 75 will then increase the speed of motor or drive means 42c, thus increasing the rate of rotational and translational movement of feed gears 101.

Although the feed gears 101 serve as the preferred embodiment of means providing forwardly moving teeth which enter successive valleys and push forwardly against the respective ribs of the corrugated tube for feeding the same through the slitting station 40, it is to be understood that the teeth may be carried by endless belts, sprocket chains or the like which may be operated in the manner heretofore described with respect to feed gears 101 without departing from the invention.

From the foregoing description, it can be seen that the apparatus of the present invention is capable of continuously extruding a tube of hot plastic material into the blow molding zone of molding machine 30 which forms corrugations of alternating ribs and valleys on the tube during forward movement thereof and while delivering the corrugated tube from the molding zone at a predetermined speed. Further, it is apparent that the speed control 70 senses variations in tension in the corrugated tube being fed and in response thereto varies the rate of feed of the tube through the slitting station to substantially accord with the rate of delivery of the tube from the blow molding zone.

As heretofore described, as the corrugated tube T passes through the slitting station 40, it is fed in a predetermined stepwise manner by the feed gears 101 and between successive stepwise movements of the corrugated tube T, the circular series of five pairs of rotary cutting blades 41, 42 simultaneously cut two circular series of radial slits in two corresponding valleys of the tube T, in the course of which the cutting blades 41, 42 form five elongate substantially uniformly spaced and arcuately extending or transverse slits through each of the corresponding valleys of the tube T. It is also seen that the stepwise movements imparted to the tube by the feeding mechanism 100 move the tube forwardly at a rate compensatingly greater than the rate at which the tube is being delivered from the molding zone and so that the overall rate of movement of the tube through the slitting station is substantially in accord with the rate of delivery of the tube from the molding zone.

As heretofore stated, the cutting station 60 may be operated by the leading end of the slit tube T engaging the obstruction embodied in the sensing arm 81 of sensing limit switch 80 so as to facilitate forming stacks B of relatively short but standard lengths of the tube T, or the sensing limit switch 80 may be immobilized and the measuring switch 90 employed instead for measuring substantial lengths of the tubing before operating the cutting station 60 to form the wound package W of FIG. 6.

In the drawings and specification there has been set forth a preferred embodiment of the invention and, although specific terms are employed, they are used in a generic sense only and not for purposes of limitation.

What is claimed is:

1. A method of making a plastic corrugated tube and forming slits therein which comprises the steps of extruding a tube of hot plastic material into a blow molding zone defined by a series of cooperating pairs of forwardly moving die blocks, while molding annular corrugations of alternating ribs and valleys on the tube during forward movement of the tube through the molding zone and while delivering the corrugated tube from the molding zone at a predetermined speed, feeding the corrugated tube delivered from the molding zone through a slitting station by meshingly engaging the corrugations of the tube with a plurality of forwardly moving teeth with successive teeth entering sucessive valleys and pushing forwardly against the respective ribs of the corrugated tube, sensing variations in tension in the corrugated tube between the blow molding zone and said feeding and in response thereto varying the rate of movement of the forwardly moving teeth to vary the rate of feed of the tube of substantially accord with the rate of delivery of the tube from the molding zone, cutting slits through certain valleys of the tube being fed as it passes through the slitting station, directing the slit tube from the slitting station through a cutting station, and cutting the tube into predetermined lengths as it passes through the cutting station.

2. A method according to claim 1, wherein the cutting of the tube into predetermined lengths includes successively cutting the corrugated tube into a plurality of uniform lengths, and further including stacking the uniform lengths in nesting relation and tieing them in a bundle.

3. A method according to claim 1, wherein the step of cutting the tube into predetermined lengths includes directing the leading end of the tube against an element spaced a predetermined distance forwardly of the cutting station, and actuating the cutting station to cut the tube into a corresponding predetermined length in response to engagement of the leading end of the tube with the element.

4. A method according to claim 1, wherein the step of cutting the tube into predetermined lengths includes sensing the linear amount of the corrugated tube being moved forwardly from the molding zone past a particular location in the path of travel of the corrugated tube, and actuating the cutting station to cut the tube in response to each sensing of a predetermined linear amount of the tube being moved past said location.

5. A method according to claim 1, including winding onto a rotating reel a predetermined length of the corrugated tube being fed, then effecting said cutting of the tube at the cutting station, and then winding the cut terminal portion of the tube onto the reel to form a wound package thereof.

6. A method according to claim 1, wherein the cutting of slits through certain valleys of the tube as it passes through the slitting station includes cutting a circular series of radial slits around the tube through each of said certain valleys thereof.

7. A method according to claim 6, wherein the tube being molded is at least about 4 inches in diameter and wherein the cutting of the circular series of radial slits further includes cutting elongate slits in substantially uniformly spaced relation through each of said certain valleys of the tube with each slit extending arcuately of and being of less width than the width of the respective valley.

8. A method according to claim 6, wherein the cutting of the circular series of radial slits further includes cutting five elongate, substantially uniformly spaced arcuately extending slits through each of said certain valleys of the tube.

9. A method according to claim 6, wherein the cutting of any given circular series of radial slits around the tube in certain valleys thereof comprises simultaneously moving a set of circularly arranged rotating cutting blades into cutting engagement with the respective valley of the tube.

10. A method according to claim 1, wherein the cutting of slits through certain valleys of the tube as it passes through the cutting station includes cutting a circular series of radial slits around the tube through each of said certain valleys, and wherein the cutting of the circular series of slits in any given valley is effected simultaneously.

11. A method according to claim 1, wherein the cutting of slits through certain valleys of the tube as it passes through the slitting station includes simultaneously cutting a circular series of radial slits around the tube through each of two alternately spaced valleys thereof.

12. A method according to claim 1, wherein the feeding of the corrugated tube through the slitting station includes feeding the tube forwardly in a stepwise manner, and wherein the cutting of slits through certain valleys comprises moving a plurality of rotary cutting blades into cutting engagement with the tube between successive stepwise movements of the tube.

13. A method according to claim 12, in which the step of feeding the corrugated tube further comprises moving the tube forwardly during the stepwise movements thereof at a rate compensatingly greater than the rate at which the corrugated tube is being delivered from the molding zone and so that the overall rate of movement of the tube through the slitting station is substantially in accord with the rate of delivery of the tube from the molding zone.

14. A method of making a plastic corrugated tube having radial slits therein which comprises the steps of continuously extruding a tube of hot plastic material into a blow molding zone defined by a series of cooperating pairs of forwardly moving die blocks, while molding corrugations of alternating ribs and valleys on the tube during forward movement of the tube through the molding zone and while delivering the corrugated tube from the molding zone at a predetermined speed, feeding the corrugated tube being delivered from the molding zone successively through slitting and cutting stations, cutting radial slits through certain valleys of the tube being fed as it passes through the slitting station, and cutting the tube into predetermined lengths as it passes through the cutting station, while sensing variations in tension in the corrugated tube between the blow molding zone and said feeding and in response thereto varying the rate of feed of the tube to substantially accord with the rate of delivery of the tube from the molding zone.

15. A method of making a plastic corrugated tube and forming radial slits therein which comprises the steps of extruding a tube of hot plastic material into a blow molding zone defined by a series of cooperating pairs of forwardly moving die blocks, while molding annular corrugations of alternating ribs and valleys on the tube during forward movement of the tube through the molding zone and while delivering the corrugated tube from the molding zone at a predeterm ned speed, feeding the corrugated tube delivered from the molding zone through a slitting station by meshingly engaging the corrugations of the tube with the peripheral teeth of at least one forwardly rotating feed gear with successive teeth thereof entering successive valleys and pushing forwardly against the respective ribs of the corrugated tube and while continuously rotating the feed gear at a peripheral speed substantially the same as the rate of delivery of the tube from the molding zone, sensing variations in tension in the corrugated tube in its course from the molding zone to the slitting station and in response thereto varying the peripheral speed of the feed gear to compensatively vary the rate of feed of the tube by the feed gear to substantially accord with the rate of delivery of the tube from the molding zone, causing the tube to dwell in the slitting station at predetermined intervals of predetermined duration by periodically imparting a rearward translational movement to the feed gear at a rate so correlated to the rate of forward rotation of the feed gear that the tube remains at a standstill in the slitting station throughout the rearward translational movement of the feed gear, then imparting a forward translational movement to the feed gear so that the feed gear moves the tube forwardly at a rate equal to the rate of rotation of the feed gear combined with the rate of forward translational movement of the feed gear and such that the overall rate of movement of the tube through the slitting station is substantially the same as the rate of delivery of the tube from the molding zone, cutting radial slits through certain valleys of the tube during each dwell of the tube in the slitting station, directing the slit tube from the slitting station through a cutting station, and cutting the tube into predetermined lengths as it passes through the cutting station.

\* \* \* \* \*

UNITED STATES PATENT OFFICE
CERTIFICATE OF CORRECTION

Patent No.  3,843,758          Dated  October 22, 1974

Inventor(s)  Ernest J. Maroschak

It is certified that error appears in the above-identified patent and that said Letters Patent are hereby corrected as shown below:

Column 4, Line 43, "3-1/2" should be --3-1/4--

Column 9, Claim 1, Line 14, after "tube" change "of" to --to--

Signed and sealed this 31st day of December 1974.

(SEAL)
Attest:

McCOY M. GIBSON JR.
Attesting Officer

C. MARSHALL DANN
Commissioner of Patents